(12) United States Patent
Travers

(10) Patent No.: US 7,007,954 B2
(45) Date of Patent: Mar. 7, 2006

(54) ANNULAR GASKET FOR A FLUID TRANSFER COUPLING, AND A COUPLING FITTED WITH SUCH A GASKET

(75) Inventor: Thierry Travers, St Fort (FR)

(73) Assignee: Le Joint Francais, Paris (FR)

( * ) Notice: Subject to any disclaimer, the term of this patent is extended or adjusted under 35 U.S.C. 154(b) by 0 days.

(21) Appl. No.: 10/875,691

(22) Filed: Jun. 25, 2004

(65) Prior Publication Data
US 2005/0001388 A1 Jan. 6, 2005

(30) Foreign Application Priority Data
Jul. 1, 2003 (FR) .................................. 03 07970

(51) Int. Cl.
*F16J 15/02* (2006.01)
(52) U.S. Cl. ...................................... 277/644; 277/626
(58) Field of Classification Search ................ 277/644, 277/530, 566, 626
See application file for complete search history.

(56) References Cited

U.S. PATENT DOCUMENTS

| | | | | |
|---|---|---|---|---|
| 3,158,376 A | * | 11/1964 | Rentschler | 277/566 |
| 3,387,661 A | * | 6/1968 | Evans et al. | 166/243 |
| 3,612,551 A | * | 10/1971 | Grabill, Jr. | 277/566 |
| 3,854,737 A | * | 12/1974 | Gilliam, Sr. | 277/566 |
| 4,232,873 A | * | 11/1980 | Hock | 277/647 |
| 4,304,415 A | | 12/1981 | Wolf et al. | |
| 4,475,738 A | * | 10/1984 | Eicher et al. | 277/345 |
| 5,002,290 A | * | 3/1991 | Pernin | 277/649 |
| 5,692,758 A | * | 12/1997 | Wikstrom | 277/591 |
| 6,343,623 B1 | * | 2/2002 | Hegler | 138/109 |
| 6,843,516 B1 | * | 1/2005 | Bishop et al. | 285/420 |

FOREIGN PATENT DOCUMENTS

| | | |
|---|---|---|
| EP | 1096182 | 5/2001 |
| FR | 2806144 | 9/2001 |

* cited by examiner

Primary Examiner—Alison K. Pickard
(74) Attorney, Agent, or Firm—Clark & Brody

(57) ABSTRACT

The invention seeks to enable a coupling to be made in which assembly forces during assembly of the gasket are small, even though the coupling is of large size, e.g. having a diameter equal to 50 mm. To achieve this object, the invention proposes making a gasket whose envelope in section presents a surface for bearing against the bottom of a groove that is smaller than the surface it presents for bearing against the fluid-feed endpiece. A fluid transfer coupling is for making between a fluid-feed endpiece and a connection tube, the coupling including an annular groove for housing the gasket, the gasket presenting a bearing face for bearing against the bottom of the groove and a bearing face for bearing against the endpiece, the groove presenting an opening and a groove bottom that is substantially flat and smaller in size than the opening. In section, the gasket of the invention presents a face for bearing against the bottom of the groove that is smaller than its face for bearing against the endpiece, the widths of the faces for bearing against the bottom and against the endpiece being determined respectively as a function of the dimensions of the bottom and of the opening of the groove. The invention is applicable to transferring air, gas, gasoline, etc., in particular under the engine hood of a motor vehicle.

8 Claims, 2 Drawing Sheets

ANNULAR GASKET FOR A FLUID TRANSFER COUPLING, AND A COUPLING FITTED WITH SUCH A GASKET

The invention relates to a annular sealing gasket for a coupling, such as the coupling provided for the endpiece of a pipe conveying a fluid such as air, oil, water or fuel (gasoline, gasoil, etc.).

The invention applies particularly but not exclusively to fluid transfer couplings (for transferring air, water, brake fluid, etc.) in the automotive industry, and more particularly under the engine hood of a vehicle.

BACKGROUND OF THE INVENTION

Automobile couplings for transferring fluid are being improved since they can enable the time required for assembly on a production line to be reduced, thereby achieving savings for the manufacturer, in particular for transferring air (filtering, turbocharging, exhaust gas recycling (EGR), etc.). These functions require leaktight couplings under the engine hood for transferring fluids between a feed pipe presenting an endpiece and a connecting tube of the engine.

Coupling manufacturers seek to provide these components using technologies that are inexpensive and that require little space. They therefore generally make parts that are rolled, and that have large radii of curvature in the bottoms of grooves for receiving sealing gaskets.

When the dimensions of a coupling are large, the O-rings presently in use require high assembly forces to be applied, so manufacturing costs are not economical.

Furthermore, lip gaskets are not suitable for fluid transfer couplings presenting large radii of curvature. In addition, the cost of a lip gasket is generally high and such a gasket is asymmetrical: it must be put into place in a particular direction and the risks of failure are not negligible.

There also exist four-lobe gaskets. These gaskets do not enable the lobes to be sufficiently compressed in the bottom of the groove when the lobes are dimensioned for a groove having a given size of opening, it being understood that the bottom of the groove is necessarily narrower than its opening. Thus, such gaskets do not enable coupling to be achieved merely by deforming the outer lobes, nor can they accommodate sufficient variety of dimensional tolerances in the bottoms of grooves. Thus, such gaskets require a significant increase in axial assembly forces.

OBJECT AND SUMMARY OF THE INVENTION

The object of the invention is thus to make it possible to make a coupling in which axial assembly forces on the gasket are small (e.g. assembly forces situated in the range 60 Newtons (N) to 80 N, which are compatible with the coupling being assembled manually) even with couplings of large size, e.g. having a diameter greater than 30 millimeters (mm) and possibly being as great as 60 mm to 70 mm.

In particular, the invention seeks to enable an "in-the-bore" type gasket to be mounted in a rolled groove in the bore, while exerting low levels of axial force.

To achieve this object, the invention proposes making a gasket of section presenting an envelope with a surface for bearing against the bottom of the groove that is smaller than the surface for bearing against the fluid-feeding endpiece.

More precisely, the present invention provides an annular gasket for a fluid transfer coupling between a feed pipe endpiece and a connection tube, the coupling including an annular groove for receiving the gasket, which gasket presents a bearing face for bearing against the bottom of the groove and a bearing face for bearing against the endpiece, the groove presenting an opening and a groove bottom that is substantially flat and smaller in size than the opening. In section, the gasket presents a bearing face for bearing against the bottom of the groove that is smaller than its bearing face for bearing against the endpiece, the widths of the bottom and endpiece bearing faces being determined respectively as a function of the dimensions of the bottom and of the opening of the groove. The gasket is of the four-lobe type presenting an X-shaped section with an envelope that is substantially trapezoidal, preferably in the form of an isosceles trapezoid, with two groove-bottom lobes forming the bearing face for bearing against the bottom of the groove and corresponding to the small base of the trapezoid, and with two contact lobes forming the bearing face for bearing against the endpiece and corresponding to the large base.

In particular embodiments:

the ratio of radial height between the bases of the trapezoid (trapezoid height) and between the bottoms of the lobes (minimum height of the gasket) is determined by the dimensions of the groove so as to provide a coupling in which the gasket is not flattened other than by deforming the lobes;

the ratio of the radial heights lies in the range 60% to 70%, and is preferably substantially equal to 70%; and the size ratio between the height of the gasket and the width of its face bearing against the endpiece lies in the range approximately 1 to 0.55.

Gaskets of the invention can be scaled to cover a large range of sizes without the lobes being reduced to a thickness of less than 0.3 mm, calculated between the points of inflection, thereby enabling large dimensional tolerances to be accommodated.

Advantageously, the gasket of the invention is made in a mold presenting two symmetrical portions. Thus, the increase in price compared with making an O-ring is minimized.

The invention also provides a coupling between a fluid feed pipe endpiece and a connection tube, the tube including an annular groove suitable for receiving a gasket presenting the above-specified characteristics.

In a particular embodiment, the ratio between the opening of the groove and the width of the gasket defined between the bottom-of-groove lobes is substantially equal to 0.7.

Couplings of the invention are preferably of the snap-fastening type.

The couplings are of the in-the-bore type when the endpiece penetrates into the connection tube or of the on-the-spigot type when the endpiece surrounds the tube forming the connection spigot. In which case, the trapezoid of the gasket is inverted relative to the axis of the coupling, its small base being closer to the axis.

BRIEF DESCRIPTION OF THE DRAWINGS

Other characteristics and advantages of the invention appear from the following description relating to a detailed example and given with reference to the accompanying figures, which show, respectively.

MORE DETAILED DESCRIPTION

Figure 1:
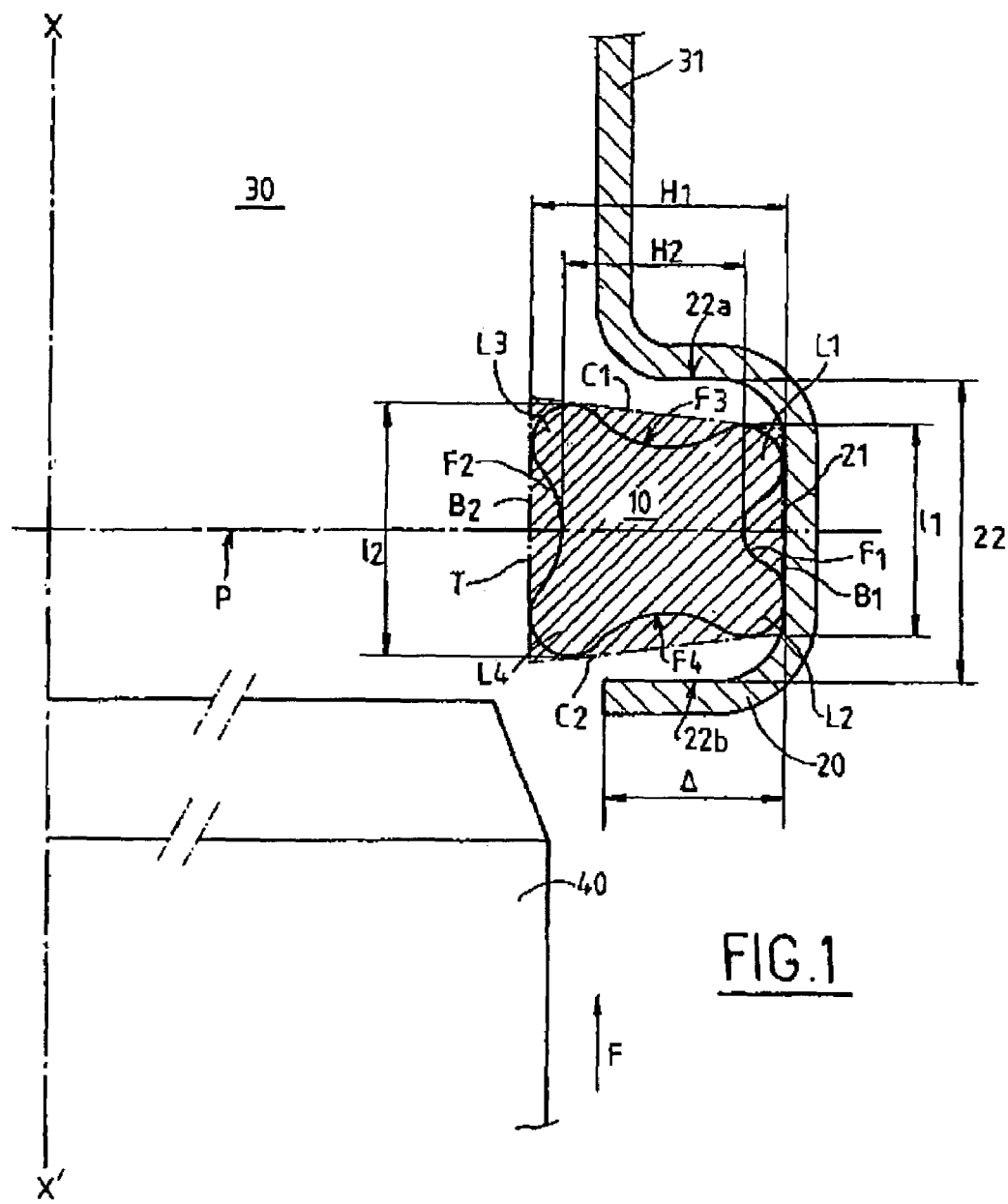
FIG. 1, a longitudinal section view of a coupling including a groove housing a gasket of the invention mounted in the bore, prior to insertion of the air pipe endpiece that is to be coupled thereto.

With reference to the longitudinal section view of FIG. 1, an example of an annular gasket 10 in accordance with the invention is received in an annular groove 20 of rolled type. The gasket is made of natural or synthetic rubber. The gasket is intended to provide a coupling in a configuration where it is mounted in the bore 30 of the connection tube 31, under the hood of a vehicle. The connection bore 30 has an inside diameter of about 46.5 mm in this example.

An air pipe endpiece 40 is directed into the bore along the axis of the tube 31 (arrow F) in order to make a coupling by snap-fastening against the groove 20. The endpiece may be made of steel or of plastics material. The snap-fastening system is known to the person skilled in the art and is not shown. The gasket, the groove, the endpiece, and the tube share a common central axis X'X of axial symmetry.

The annular groove 20 possesses two parallel radial walls 22a and 22b forming an opening 22 of constant width equal to 4.4 mm and presenting a depth Δ. The bottom of the axial groove 21 is substantially flat, having a width of 3.05 mm, and meets the radial walls via two curves having a radius of curvature of 1 mm. The bottom of the groove is made of shaped metal.

The gasket 10 presents a bearing face F1 for bearing against the bottom 21 of the groove 20, a bearing face F2 for co-operating with the endpiece 40, and two side faces F3 and F4. Together these faces are inscribed, in section, in an isosceles trapezoid T having a small base B1 that coincides substantially with the bottom of the groove 21 when the gasket is received in the groove, a large base B2 opposite from the small base B1, and two sides C1 and C2 that are symmetrical about a transverse plane of symmetry P of the gasket 10.

The gasket 10 has four lobes L1 to L4 presenting an X-shape in a section that is inscribed in the trapezoidal envelope T.

In this example, the bearing face F1 of the gasket for bearing against the bottom of the groove comprises two lips which, in section, form two lobes L1 and L2 that are symmetrical about the plane P and that define a groove-bottom bearing face with width l1 of 3.05 mm. Similarly, in this example, the bearing face F2 of the coupling for bearing against the endpiece 40 comprises two lips that in section form two symmetrical lobes L3 and L4 defining an endpiece bearing face with width l2 of 3.65 mm which is greater than the width l1 for bearing against the bottom face, given the trapezoidal shape of the gasket. The values for l1 and l2 are calculated as a function of the dimensions of the groove 20, i.e. respectively of its bottom 21 and of its opening 22.

The gasket 10 presents two heights in a radial direction: a gasket height H1 constituting the height of the trapezoid (i.e. the distance between the bases of the trapezoid), that is equal to 3.40 mm in this example, and a height H2 between the bottoms of the lobes corresponding to the minimum distance between the bearing faces, which in this case is equal to 2.39 mm. The ratio between the radial heights in this example is about 70%.

This ratio is calculated as a function of the tolerances applicable to the dimensions for the bottom of the groove 21, and also on the sizes associated specifically with the coupling to be made: the gasket height H1, the bore 30 and the diameter of the endpiece 40, the endpiece 40 being guided in the bore 30. As a function of these tolerances, a clamping range is defined for the gasket. For example, nominal clamping of the gasket equal to 15% corresponds to an axial force of 60 N, while extreme clamping of 3% corresponds to a minimum force of 40 N, and of 28% corresponds to a maximum force of 90 N. In this example, the clamping range is thus equal to 25%, which defines the ratio of gasket heights to be about 70% in order to avoid the center of the gasket being flattened.

Figure 2:
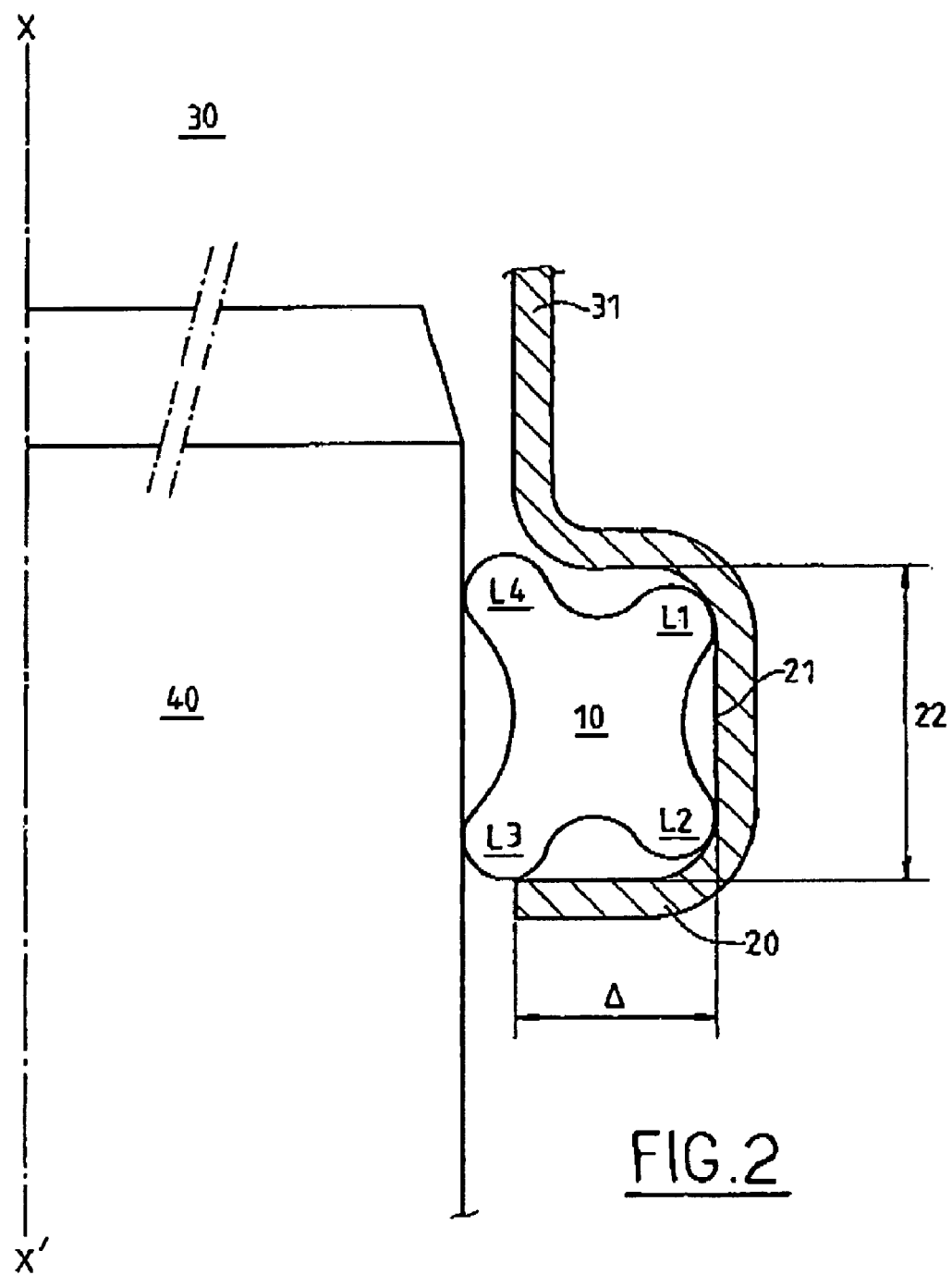
FIG. 2 is a view of the same type after the endpiece has been coupled.

Under such conditions, and as shown in FIG. 2, coupling is achieved without flattening the gasket 10 other than deforming the lobes L1 to L4 while the air pipe is being coupled, with the gasket bearing against the endpiece 40.

In order to exert small forces while inserting and passing the endpiece 40 into and through the gasket 10, the size ratio defined between the height H1 of the gasket and the endpiece width l2 of the gasket is advantageously equal to about 0.9.

The gasket is made in this example in a mold presenting two identical half-shells so as to make two half-gaskets that are symmetrical about the transverse plane of symmetry P, the two half-gaskets together constituting the above-described gasket.

The invention is not limited to the embodiments described and shown, with all of the technical means mentioned coming within its field of definition. For example, the endpiece bearing face may be formed to have a multiple lip of the "poly-V" type. The trapezoidal envelope may be rectangular on the side via which the endpiece for coupling penetrates, or more generally it may be arbitrary.

What is claimed is:

1. An annular gasket for a fluid transfer coupling between a feed pipe endpiece and a connection tube, the coupling including an annular groove for receiving the gasket, which gasket presents a bearing face for bearing against the bottom of the groove and a bearing face for bearing against the endpiece, the groove presenting an opening and a groove bottom that is substantially flat and smaller in size than the opening, the gasket presenting in section a bearing face for bearing against the bottom of the groove that is smaller than its bearing face for bearing against the endpiece, the widths of the bottom and endpiece bearing faces being determined respectively as a function of the dimensions of the bottom and of the opening of the groove, the gasket being of the four-lobe type presenting an X-shaped section with an envelope that is substantially trapezoidal with two groove-bottom lobes forming the bearing face for bearing against the bottom of the groove and corresponding to the small base of the trapezoid, and with two contact lobes forming the bearing face for bearing against the endpiece and corresponding to the large base, in which the ratio of radial height between the bases of the trapezoid and between the bottoms of the lobes is determined by the dimensions of the groove so as to provide a coupling in which the gasket is not flattened other than by deforming the lobes and in which the ratio of the radial heights lies in the range 60% to 70%.

2. An annular gasket according to claim 1, in which the ratio of the radial heights is substantially equal to 70%.

3. An annular gasket according to claim 1, the gasket being made in a mold presenting two symmetrical portions.

4. An annular gasket according to claim 1 presenting an X-shaped cross section with an envelope that is substantially in the form of an isosceles trapezoid.

5. An annular gasket for a fluid transfer coupling between a feed pipe endpiece and a connection tube, the coupling including an annular groove for receiving the gasket, which gasket presents a bearing face for bearing against the bottom of the groove and a bearing face for bearing against the endpiece, the groove presenting an opening and a groove bottom that is substantially flat and smaller in size than the opening, the gasket presenting in section a bearing face for bearing against the bottom of the groove that is smaller than its bearing face for bearing against the endpiece, the widths of the bottom and endpiece bearing faces being determined respectively as a function of the dimensions of the bottom and of the opening of the groove, the gasket being of the four-lobe type presenting an X-shaped section with an envelope that is substantially trapezoidal with two groove-bottom lobes forming the bearing face for bearing against the bottom of the groove and corresponding to the small base of the trapezoid, and with two contact lobes forming the bearing face for bearing against the endpiece and corresponding to the large base, in which the size ratio between the height of the gasket and the width of its face bearing against the endpiece lies in the range approximately 1 to 0.55.

6. A coupling between a fluid feed pipe endpiece and a connection tube, the tube including an annular groove suitable for receiving a gasket that presents a bearing face for bearing against the bottom of the groove and a bearing face for bearing against the endpiece, the groove presenting an opening and a groove bottom that is substantially flat and smaller in size than the opening, the gasket presenting in section a bearing face for bearing against the bottom of the groove that is smaller than its bearing face for bearing against the endpiece, the widths of the bottom and endpiece bearing faces being determined respectively as a function of the dimensions of the bottom and of the opening of the groove, the gasket being of the four-lobe type presenting an X-shaped section with an envelope that is substantially trapezoidal with two groove-bottom lobes forming the bearing face for bearing against the bottom of the groove and corresponding to the small base of the trapezoid, and with two contact lobes forming the bearing face for bearing against the endpiece and corresponding to the large base, in which the ratio between the opening of the groove and the width of the gasket defined between the bottom-of-groove lobes is substantially equal to 0.7.

7. A coupling according to claim 6, the coupling being of the snap-fastening type.

8. A coupling according to claim 6, the coupling being of the in-the-bore type, when the endpiece penetrates into the connection tube, or of the on-the-spigot type when the endpiece surrounds the tube forming the connection spigot.

* * * * *